United States Patent
Bernstein et al.

(10) Patent No.: US 8,347,260 B2
(45) Date of Patent: Jan. 1, 2013

(54) METHOD OF DESIGNING AN INTEGRATED CIRCUIT BASED ON A COMBINATION OF MANUFACTURABILITY, TEST COVERAGE AND, OPTIONALLY, DIAGNOSTIC COVERAGE

(75) Inventors: Kerry Bernstein, Underhill, VT (US); James A. Culp, Newburgh, NY (US); Leah M. P. Pastel, Essex, VT (US); Kirk D. Peterson, Jericho, VT (US); Norman J. Rohrer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 12/880,228

(22) Filed: Sep. 13, 2010

(65) Prior Publication Data

US 2012/0066657 A1     Mar. 15, 2012

(51) Int. Cl.
*G06F 11/22*     (2006.01)
(52) U.S. Cl. ........................... 716/136; 716/119
(58) Field of Classification Search .................. 716/119, 716/136; 714/33, 731, 738
See application file for complete search history.

(56) References Cited

U.S. PATENT DOCUMENTS

| | | | |
|---|---|---|---|
| 5,027,355 A | 6/1991 | Stoica | |
| 5,341,382 A | 8/1994 | Levitt | |
| 5,539,652 A * | 7/1996 | Tegethoff | 703/14 |
| 5,684,946 A | 11/1997 | Ellis et al. | |
| 6,070,258 A | 5/2000 | Asaka | |
| 6,694,466 B1 | 2/2004 | Tsai et al. | |
| 6,781,151 B2 | 8/2004 | Schultz et al. | |
| 6,954,887 B2 | 10/2005 | Wang et al. | |
| 7,254,791 B1 | 8/2007 | Agrawal et al. | |

(Continued)

FOREIGN PATENT DOCUMENTS

| | | |
|---|---|---|
| EP | 1034479 B1 | 9/2000 |
| JP | 10143554 | 5/1998 |

OTHER PUBLICATIONS

Stiles et al., "Using DFM Routing to Impact Design Performance and Yield," Internet.

(Continued)

*Primary Examiner* — Vuthe Siek
*Assistant Examiner* — Mohammed Alam
(74) *Attorney, Agent, or Firm* — Gibb & Riley, LLC; Richard M. Kotulak, Esq.

(57) ABSTRACT

Disclose are embodiments of an integrated circuit design method based on a combination of manufacturability, test coverage and, optionally, diagnostic coverage. Design-for manufacturability (DFM) modifications to the layout of an integrated circuit can be made in light of test coverage. Alternatively, test coverage of an integrated circuit can be established in light of DFM modifications. Alternatively, an iterative process can be performed, where DFM modifications to the layout of an integrated circuit are made in light of test coverage and then test coverage is altered in light of the DFM modifications. Alternatively, DFM modifications to the layout of an integrated circuit can be made in light of test coverage and also diagnostic coverage. In any case, after making DFM modifications and establishing test coverage, any unmodified and untested nodes (and, optionally, any unmodified and undiagnosable tested nodes) in the integrated circuit can be identified and tagged for subsequent in-line inspection.

25 Claims, 6 Drawing Sheets

U.S. PATENT DOCUMENTS

| | | |
|---|---|---|
| 7,343,570 B2 | 3/2008 | Bowers et al. |
| 7,512,508 B2 | 3/2009 | Rajski et al. |
| 2001/0000427 A1* | 4/2001 | Miller et al. ............... 333/33 |
| 2006/0066338 A1* | 3/2006 | Rajski et al. ............... 324/765 |
| 2006/0069958 A1* | 3/2006 | Sawicki et al. ............ 714/33 |
| 2006/0253751 A1 | 11/2006 | Gunda et al. |
| 2010/0058260 A1 | 3/2010 | Correale, Jr. et al. |
| 2010/0115485 A1* | 5/2010 | Nonaka ....................... 716/10 |
| 2010/0332928 A1* | 12/2010 | Li et al. ..................... 714/731 |
| 2011/0148456 A1* | 6/2011 | Mooyman-Beck et al. ................... 324/762.02 |

OTHER PUBLICATIONS

IBM et al., "Design Methodology for IBM ASIC Products," www.ip.com, Prior Art Database, IPCOM000164140D, Jul. 31, 1996.

Sousa et al., "IC Defects-Based Testability Analysis," IEEE International Test Conference, pp. 500-509, 1991.

* cited by examiner

METHOD OF DESIGNING AN INTEGRATED CIRCUIT BASED ON A COMBINATION OF MANUFACTURABILITY, TEST COVERAGE AND, OPTIONALLY, DIAGNOSTIC COVERAGE

BACKGROUND

1. Field of the Invention

The embodiments relate to integrated circuit design methods and, more particularly, to an integrated circuit design method based on a combination of manufacturability, test coverage and, optionally, diagnostic coverage.

2. Description of the Related Art

Integrated circuit design methods often incorporate both design-for-manufacturability (DFM) techniques and design-for-testability (DFT) techniques. DFM techniques typically involve making modifications to the layout of an integrated circuit based on a pre-established set of rules to improve the manufacturability of the integrated circuit (i.e., to improve yield and/or reliability of the integrated circuit, as manufactured). For example, DFM modifications can be made to enhance elements of individual cells, to enhance higher-level routing (e.g., by increasing wire widths and/or by providing redundant vias), to enhance memory redundancy, to increase spacing between wires or vias, to avoid particularly difficult to print layout patterns, etc. DFT techniques typically involve making modifications to the layout of an integrated circuit to improve testability (i.e., to improve test coverage during testing to validate the functioning the integrated circuit, as manufactured). For example, DFT modifications can include the addition of testable features to the layout of the integrated circuit in order to increase test coverage. It should be noted, however, that even with DFT modifications, 100% test coverage (e.g., test coverage of all nodes in an integrated circuit) is typically cost prohibitive, limited by design, test feasibility, and test time constraints. Furthermore, while both DFM and DFT techniques are incorporated into the design process, DFM modifications are typically made without consideration or knowledge of test coverage and vice versa.

SUMMARY

In view of the foregoing, disclosed herein are embodiments of an integrated circuit design method based on a combination of manufacturability, test coverage and, optionally, diagnostic coverage. In one embodiment, design-for manufacturability (DFM) modifications to the layout of an integrated circuit can be made in light of test coverage. In another embodiment, test coverage of an integrated circuit can be established in light of DFM modifications. In yet another embodiment, an iterative process can be performed, for example, where DFM modifications to the layout of an integrated circuit can be made in light of test coverage and then test coverage can be altered in light of the DFM modifications. Finally, in yet another embodiment, DFM modifications to the layout of an integrated circuit can be made in light of test coverage and also in light of the diagnostic coverage. In any case, after making DFM modifications and establishing test coverage, any unmodified and untested nodes in the integrated circuit can be identified and tagged for subsequent in-line inspection.

More particularly, in one embodiment of the design method, DFM modifications to the layout of an integrated circuit can be made in light of test coverage. Specifically, a set of test patterns for testing an integrated circuit can be generated, based on a description (e.g., a netlist for the integrated circuit). Next, test coverage can be determined and, more specifically, nodes covered by the test patterns (i.e., tested nodes) and nodes not covered by the test patterns (i.e., untested nodes) can be identified. Additionally, the description of the integrated circuit can be converted to a layout of the integrated circuit. Finally, modifications can be made to the layout, based on a set of design-for-manufacturability (DFM) rules, which specify different application requirements for the untested nodes as compared to the test nodes. For example, a particular DFM rule can require mandatory application to all of the untested nodes, but only discretionary application to the tested nodes. Another particular DFM rule can require application to any untested nodes at a higher priority than to any tested nodes.

In another embodiment of the integrated circuit design method, rather than making DFM modifications to the layout of an integrated circuit in light of test coverage, as described above, test coverage can be established in light of DFM modifications. Specifically, a description of the integrated circuit (e.g., a netlist for the integrated circuit) can be converted to a layout of the integrated circuit. Then, based on a set of design-for-manufacturability (DFM) rules, modifications can be to the layout. After the modifications are made to the layout, modified nodes and unmodified nodes in the integrated circuit can be identified. Finally, based on the description of the integrated circuit, a set of test patterns for testing the integrated circuit can be generated with test coverage for the unmodified nodes having a higher priority than test coverage for the modified nodes.

Alternatively, rather than basing DFM modifications on test coverage or establishing test coverage based on DFM modifications, an iterative process can be performed, for example, where DFM modifications to the layout of an integrated circuit are made in light of test coverage and then test coverage is altered in light of the DFM modifications. Specifically, a first set of test patterns for testing an integrated circuit can be generated, based on description of the integrated circuit (e.g., a netlist for the integrated circuit). Next, nodes covered by the test patterns (i.e., tested nodes) and nodes not covered by the test patterns (i.e., untested nodes) can be identified. Then, the description of the integrated circuit can further be converted to a layout of the integrated circuit. Modifications can be made to the layout, based on a set of design-for-manufacturability (DFM) rules, which specify different application requirements for the untested nodes as compared to the test nodes. After the DFM modifications are made, modified nodes and unmodified nodes in the integrated circuit can be identified. Finally, a second set of test patterns for testing the integrated circuit can be generated with test coverage for the unmodified nodes having a higher priority than test coverage for the modified nodes.

In yet another embodiment, DFM modifications to the layout of an integrated circuit can be made in light of test coverage and also in light of the diagnostic coverage. Specifically, a set of test patterns for testing an integrated circuit can be generated, based on a description of the integrated circuit (e.g., a netlist for the integrated circuit). Next, nodes covered by the test patterns (i.e., tested nodes) and nodes not covered by the test patterns (i.e., untested nodes) can be identified. Then, the description of the integrated circuit can further be converted to a layout of the integrated circuit. In this case, the description of the integrated circuit is further analyzed in order to identify, from amongst all of the tested nodes, undiagnosable tested nodes and diagnosable tested nodes. Finally, modifications can be made to the layout of the integrated circuit, based on a set of design-for manufacturability (DFM) rules, which specify different application requirements for the untested nodes, the undiagnosable tested nodes and the diagnosable tested nodes. For example, a particular DFM rule can specify mandatory application to all of the untested nodes and all of the undiagnosable tested nodes, but only discretionary application to any of the diagnosable tested nodes. Another particular DFM rule can specify a high priority for application to any untested nodes, a low priority for application to any diagnosable tested nodes and a priority between the high and low priorities for application to any undiagnosable tested nodes.

In any of the above-described embodiments, after making modifications to the layout and establishing test coverage and, optionally, diagnostic coverage, any unmodified and untested nodes (and, optionally, any unmodified and undiagnosable tested nodes) in the integrated circuit can be identified and tagged for subsequent in-line inspection.

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

Figure 1:
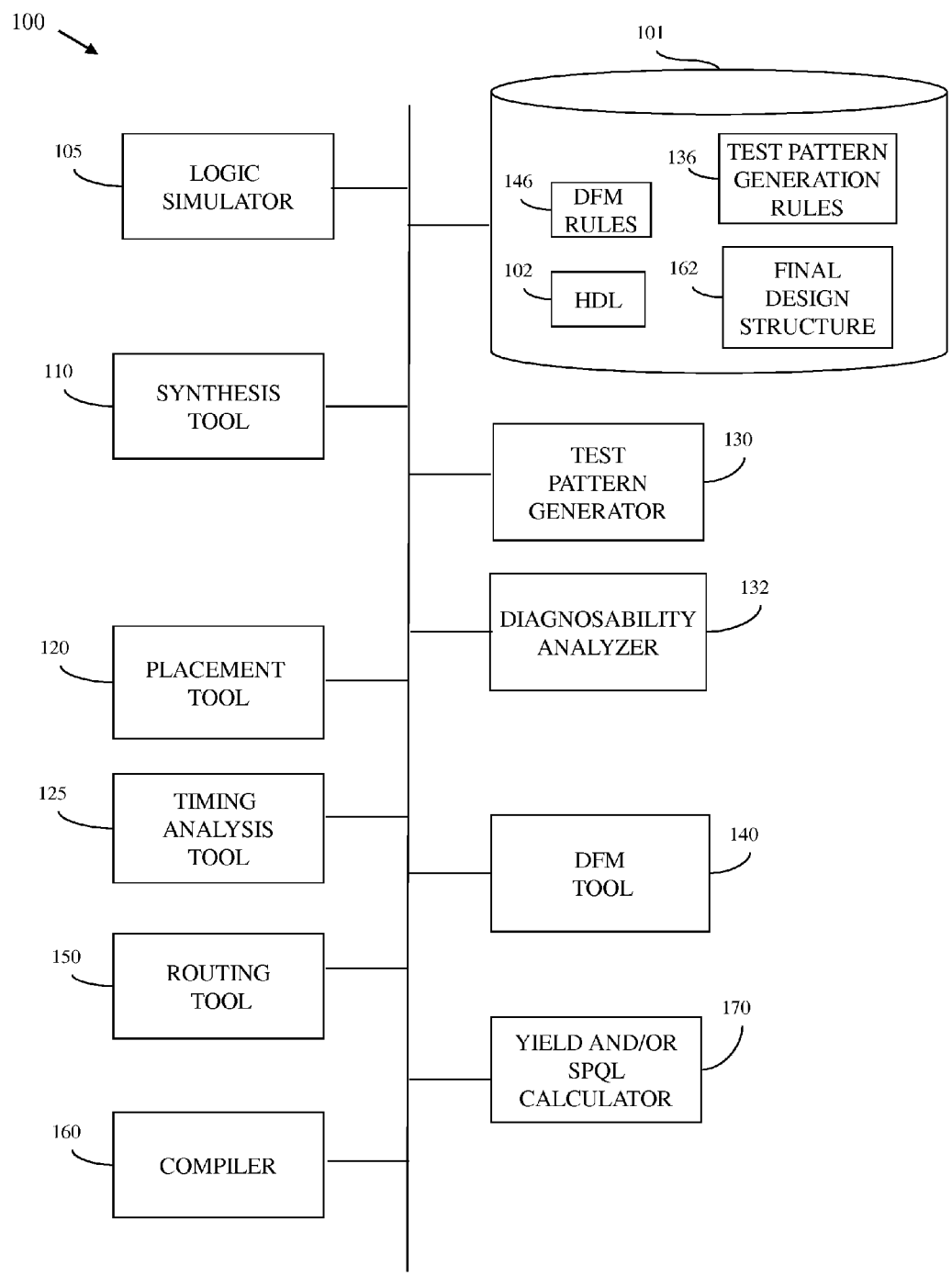
FIG. 1 is a box diagram illustrating an integrated circuit design system.

The embodiments of the invention and the various features and advantageous details thereof are explained more fully with reference to the non-limiting embodiments that are illustrated in the accompanying drawings and detailed in the following description.

Integrated circuit design methods typically begin with a high-level description of the integrated circuit. This high-level description sets out the requirements for the integrated circuit and is stored on a data storage device in, for example, a hardware description language (HDL), such as VHDL or Verilog. Next, a logic synthesis tool (i.e., a synthesis engine) accesses the data storage device and synthesizes the high-level description into a low-level description of the integrated circuit chip (e.g., a gate-level netlist). Based on this low-level description, a placement tool establishes placement for devices on an integrated circuit chip or, more particularly, placement of groups of interconnected devices, referred to as cells or blocks, on an integrated circuit chip. Once placement is established, a timing analysis tool performs a timing analysis on the integrated circuit chip to verify circuit logic and timing at one or more specific timing corners. Placement and timing analysis are repeated, if necessary, to ensure timing specifications are met. Then, a routing tool provides a detailed routing for the integrated circuit chip. This detailed routing defines the wires that will interconnect the cells. Finally, a compiling tool compiles the final results from the placement tool, timing analysis tool and routing tool in order to generate a final design structure.

Oftentimes, integrated circuit design methods incorporate both design-for-manufacturability (DFM) techniques and design-for-testability (DFT) techniques. DFM techniques typically involve making modifications to the layout of an integrated circuit based on a pre-established set of rules to improve the manufacturability of the integrated circuit (i.e., to improve yield and/or reliability of the integrated circuit, as manufactured). For example, DFM modifications can be made to enhance elements of individual cells, to enhance higher-level routing (e.g., by increasing wire widths and/or by providing redundant vias), to enhance memory redundancy, etc. DFT techniques typically involve making modifications to the design of an integrated circuit to improve testability (i.e., to improve test coverage during testing to validate the functioning the integrated circuit, as manufactured). For example, DFT modifications can include the addition of testable features to the layout of the integrated circuit in order to increase test coverage. It should be noted, however, that even with DFT modifications, 100% test coverage (e.g., test coverage of all nodes in an integrated circuit) is typically cost prohibitive, limited by design, test feasibility, and test time constraints. Furthermore, while both DFM and DFT techniques are incorporated into the design process, DFM modifications are typically made without consideration or knowledge of test coverage and vice versa.

In view of the foregoing, disclosed herein are embodiments of an integrated circuit design method based on a combination of manufacturability, test coverage and, optionally, diagnostic coverage. In one embodiment, design-for manufacturability (DFM) modifications to the layout of an integrated circuit can be made in light of (i.e., with knowledge and consideration of) test coverage. In another embodiment, test coverage of an integrated circuit can be established in light of (i.e., with knowledge and consideration of) DFM modifications. In yet another embodiment, an iterative process can be performed, for example, where DFM modifications to the layout of an integrated circuit are made in light of test coverage and then test coverage is altered in light of the DFM modifications. Finally, in yet another embodiment, DFM modifications to the layout of an integrated circuit can be made in light of (i.e., with knowledge and consideration of) test coverage and also in light of diagnostic coverage. In any case, after making DFM modifications and establishing test coverage, any unmodified and untested nodes (and, optionally, any unmodified and undiagnosable tested nodes) in the integrated circuit can be identified and tagged for subsequent in-line inspection.

More particularly, FIG. 1 is a block diagram illustrating an exemplary design system 100 that can be used to implement the integrated circuit design method embodiments 200-500 described in detail below and illustrated in FIGS. 2-5, respectively.

Figure 2:
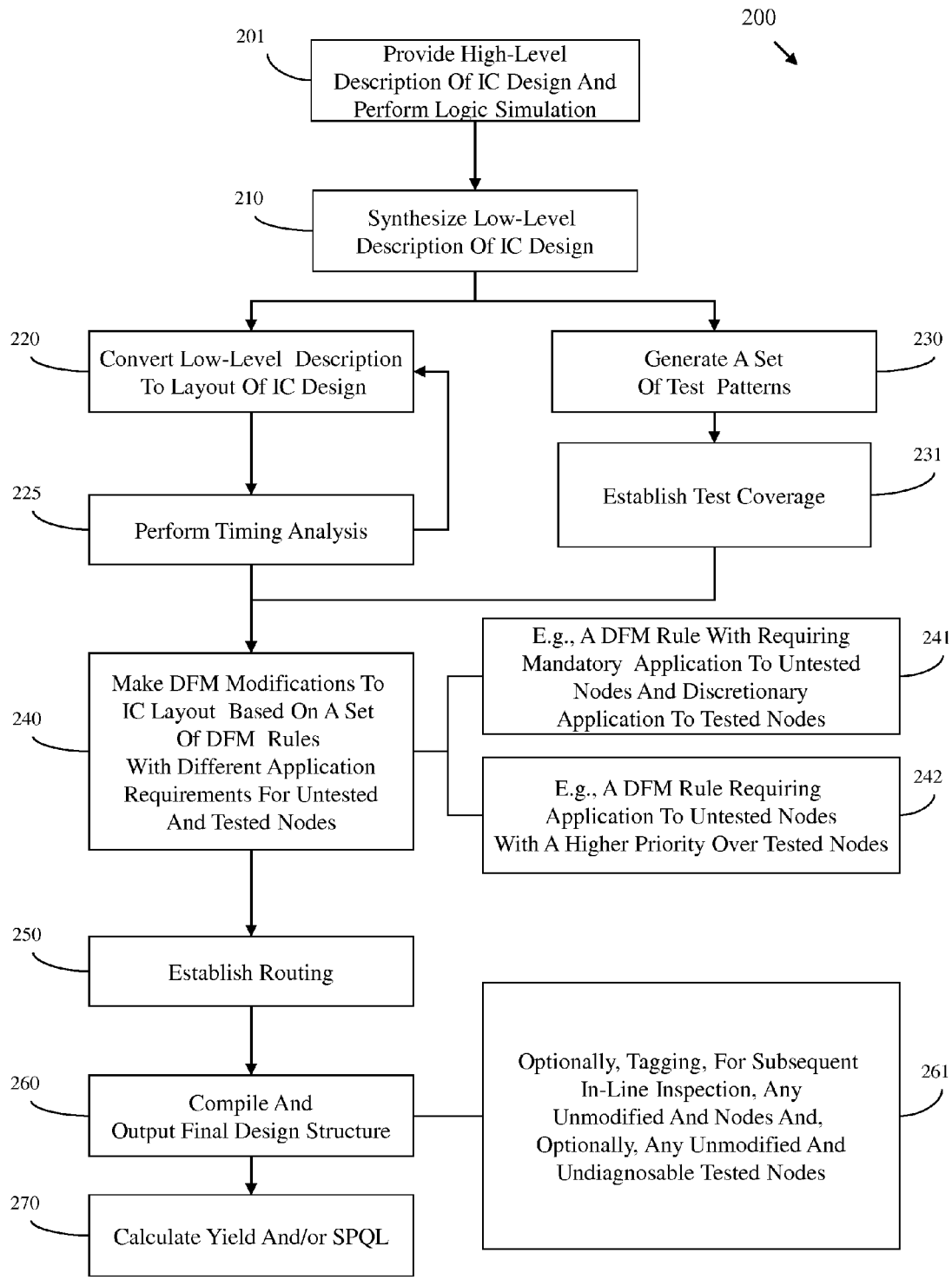
FIG. 2 is a flow diagram illustrating one embodiment of an integrated circuit design method that can be implemented using the system of FIG. 1.

Referring to FIG. 2 in combination with FIG. 1, in one embodiment of the integrated circuit design method, DFM modifications to the layout of an integrated circuit can be made in light of (i.e., with knowledge and consideration of) test coverage.

Specifically, a first-level description 102 of an integrated circuit can be stored in a data storage device 101 (201). This first-level description 102 can comprise a high-level description, which sets out the requirements for the integrated circuit in a hardware description language (HDL) (e.g., VHDL or Verilog). Logic simulation of the high-level description can be performed (e.g., by a logic simulator 105) in order to verify the design logic.

Next, a second-level description of the integrated circuit can be synthesized based on the first-level description 102 (210). That is, the high-level description of the integrated circuit can be synthesized into (i.e., converted into) an optimized lower-level description (e.g., a netlist, such as a gate-level or test netlist) by, for example, a logic synthesis tool 110.

Based on this second-level description of the integrated circuit (e.g., based on the netlist for the integrated circuit), a set of test patterns for testing the integrated circuit can be generated by a test pattern generator 130 (e.g., an Automatic Test Pattern Generator) (230). The test patterns can be generated based on a set of rules for test pattern generation 136 (e.g., stored in the data storage device 101). These rules can, for example, be economically based (e.g., require testing for shorts and opens in only those nodes where costs associated with testing are minimal). Those skilled in the art will recognize that often times preconditioning of a machine state needed to position a given node for deterministic testing is so prohibitively expensive that it is not economically feasible to test the node. Such test patterns will be applied to the integrated circuit during subsequent testing to validate circuitry functioning at various nodes in the integrated circuit, as manufactured. Next, test coverage can be established (e.g., by the test pattern generator 130) and, more specifically, nodes covered by the test patterns (i.e., tested nodes) and nodes not covered by the test patterns (i.e., untested nodes) can be identified and tagged for future reference (231).

Additionally, the second-level description of the integrated circuit (e.g., the netlist of the integrated circuit) can further be converted to a layout of the integrated circuit (220). For example, a placement tool 120 can establish placement of devices or, more particularly, placement of groups of interconnected devices (i.e., cells or blocks) as set forth in the second-level description. Layout versus schematic (LVS) checking techniques can be used to associate specific polygons in the layout with the untested and tested nodes and can tag them accordingly in the layout (e.g., with a special code). Once placement is established, timing analysis can be performed on the integrated circuit (225). That is, a timing analysis tool 125 can verify circuit logic and timing at one or more specific timing corners. It should be noted that placement and timing analysis can be iteratively repeated, if necessary, to ensure timing specifications are met.

Modifications can then be made to the layout by a design-for-manufacturability (DFM) tool 140 and based on a set of design-for-manufacturability (DFM) rules 146 (240). Specifically, a set of DFM rules 146 (e.g., stored in the data storage device 101) can set out rules regarding minimum distances, sizes, enclosure criteria, etc. for implementing the layout and can, thereby improve the manufacturability of the integrated circuit (i.e., to improve yield and/or reliability of the integrated circuit, as manufactured). For example, DFM modifications can be made by a DFM tool 140 to enhance elements of individual cells, to enhance higher-level routing (e.g., by increasing wire widths and/or by providing redundant vias), to enhance memory redundancy, to increase spacing between wires or vias, to avoid particularly difficult to print layout patterns, etc. Additionally, these DFM rules 146 can further specify different application requirements for the untested nodes as compared to the test nodes, as identified at process 231. That is, one particular DFM rule can require mandatory application to all of the untested nodes (i.e., to the circuitry from which untested nodes receive signals), but only discretionary application to any of the tested nodes (i.e., to the circuitry from which any tested nodes receive signals) (241). For example, a rule can specify mandatory formation of redundant vias within the circuitry connected to untested nodes and/or mandatory increases in wire width for wires within the circuitry connected to untested nodes. Another particular DFM rule can require application to any untested nodes at a higher priority than application to the tested nodes (242). For example, a rule can specify that, when space constraints limit redundant via formation, redundant vias shall be formed within the circuitry connected to untested nodes before such redundant vias are formed within the circuitry connected to tested nodes and/or that, when space constraints limit increases in wire width, wires within the circuitry connected to untested nodes will be increased in width before wires within the circuitry connected to tested nodes.

It should be noted, during the process 231 of establishing test coverage, duplicate nodes (i.e., nodes which receive signals from essentially identical circuitry at different locations within the integrated circuit) can further be identified. Then, for a group of duplicate nodes, if at least one node is a tested node and at least one node is an untested node, all of the nodes in the group can be treated as tested nodes for purposes of making modifications based on the set of DFM rules at process 240. This is because failure of the tested node can indicate corresponding failure of any of the untested nodes in the same group of duplicate nodes, effectively extending test coverage to the duplicate untested nodes.

Consequently, in this embodiment of the design method, DFM modifications are made in light of (i.e., with knowledge and consideration of) test coverage so that as many untested nodes as possible are covered by DFM to avoid subsequent failure in the manufactured product. In other words, for selected nodes, test coverage is supplanted by a more robust layout due to DFM modifications.

Figure 3:
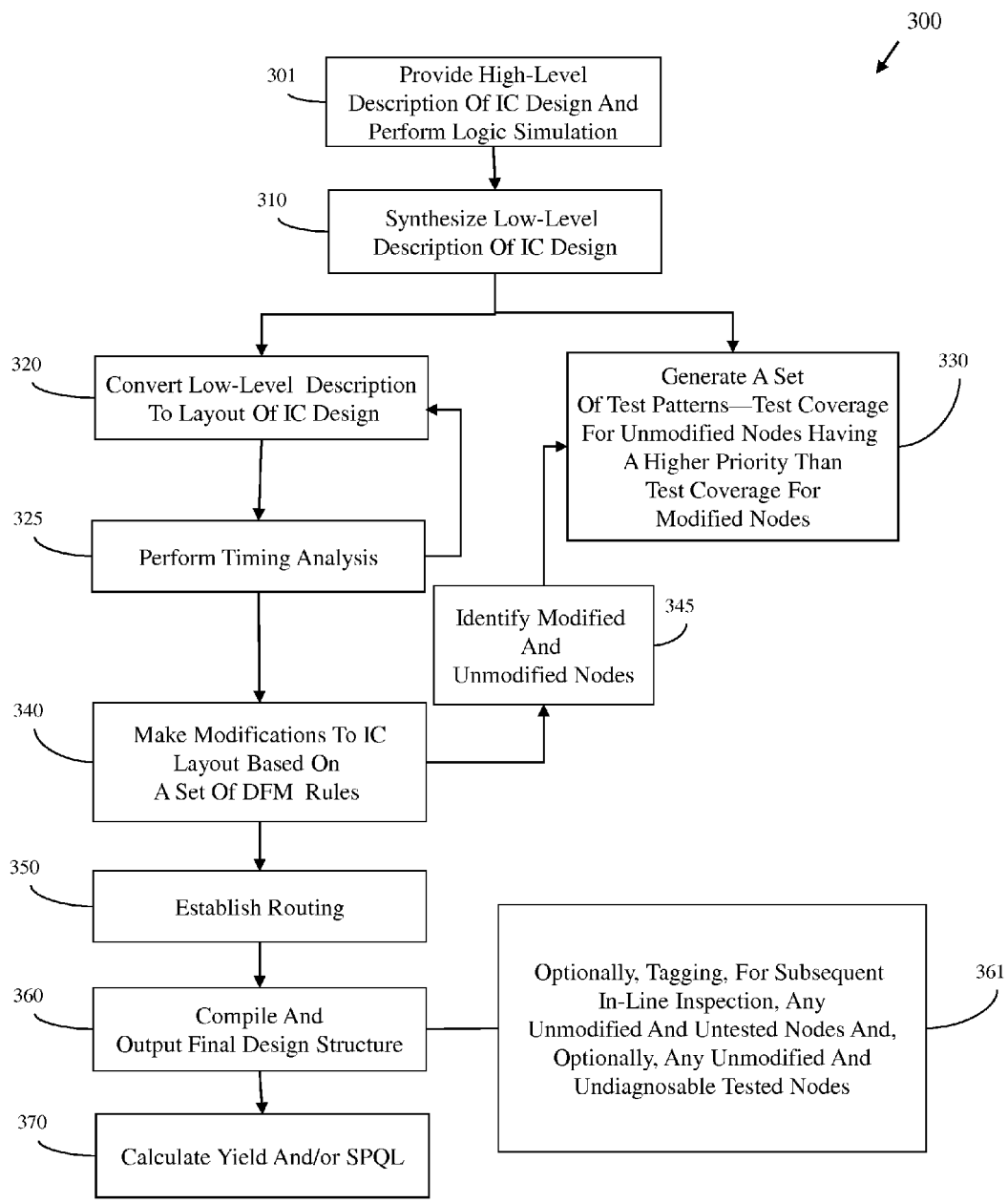
FIG. 3 is a flow diagram illustrating another embodiment of an integrated circuit design method that can be implemented using the system of FIG. 1.

Referring to FIG. 3 in combination with FIG. 1, in another embodiment of the integrated circuit design method, rather than making DFM modifications to the layout of an integrated circuit in light of test coverage, as described above and illustrated in FIG. 2, test coverage can be established in light (i.e., with knowledge and consideration of) of DFM modifications.

Specifically, a first-level description 102 of an integrated circuit can be stored in a data storage device 101 (301). This first-level description 102 can comprise a high-level description, which sets out the requirements for the integrated circuit in a hardware description language (HDL) (e.g., VHDL or Verilog). Logic simulation of the high-level description can be performed (e.g., by a logic simulator 105) in order to verify the design logic.

Next, a second-level description of the integrated circuit can be synthesized based on the first-level description 102 (310). That is, the high-level description can be synthesized into (i.e., converted into) an optimized lower-level description (e.g., a netlist, such as a gate-level or test netlist) by, for example, a logic synthesis tool 110.

This second-level description of the integrated circuit (e.g., the netlist for the integrated circuit) can further be converted to a layout of the integrated circuit (320). For example, a placement tool 120 can establish placement of devices or, more particularly, placement of groups of interconnected devices (i.e., cells or blocks) as set forth in the second-level description. Once placement is established, timing analysis can be performed on the integrated circuit (325). That is, a timing analysis tool 125 can verify circuit logic and timing at one or more specific timing corners. It should be noted that placement and timing analysis can be iteratively repeated, if necessary, to ensure timing specifications are met.

Modifications can then be made to the layout by a design-for-manufacturability (DFM) tool 140 and based on a set of design-for-manufacturability (DFM) rules 146 (340). Specifically, a set of DFM rules 146 (e.g., stored in the data storage device 101) can set out rules regarding minimum distances, sizes, enclosure criteria, etc. for implementing the layout and can, thereby improve the manufacturability of the integrated circuit (i.e., to improve yield and/or reliability of the integrated circuit, as manufactured) overall. For example, DFM modifications can be made to enhance elements of individual cells, to enhance higher-level routing (e.g., by increasing wire widths and/or by providing redundant vias), to enhance memory redundancy, to increase spacing between wires or vias, to avoid particularly difficult to print layout patterns, etc.

After the DFM modifications are made to the layout at process 340, modified nodes and unmodified nodes in the integrated circuit can be identified and tagged (e.g., with a special code) in the first-level description 102 (345) in order to distinguish nodes having a more robust layout from those having a less robust layout due to DFM modifications. For example, layout versus schematic (LVS) checking techniques can be used to associate specific polygons in the layout with the modified and unmodified nodes and then tag them accordingly in the first-level description 102. For the purpose of this disclosure, the term "modified nodes" refers to nodes receiving signals from circuitry that has been subject to DFM modifications and the term "unmodified nodes" refers to nodes receiving signals from circuitry that has not been subject to DFM modifications.

Then, based on the second-level description 102 of the integrated circuit (e.g., based on the netlist for the integrated circuit), a set of test patterns for testing the integrated circuit can be generated by a test pattern generator 130 (e.g., an Automatic Test Pattern Generator) (330). The test patterns can be generated based on a set of rules for test pattern generation 136 (e.g., stored in the data storage device 101). These rules can, for example, be economically based (e.g., can require testing for shorts and opens at only those nodes where costs associated with testing are minimal). Additionally, these rules can further specifically indicate that test coverage for the unmodified nodes, as identified at process 345, should have a higher priority than test coverage for the modified nodes. As in the previously described embodiment, the test patterns will be applied to the integrated circuit during subsequent testing to validate the functioning of the various nodes in the integrated circuit, as manufactured.

Consequently, in this embodiment of the design method, test coverage is established in light of (i.e., with knowledge and consideration of) DFM modifications so that as many unmodified nodes as possible are covered by test patterns. In other words, for selected nodes, a more robust layout due to DFM modifications is supplanted by test coverage.

Figure 4:
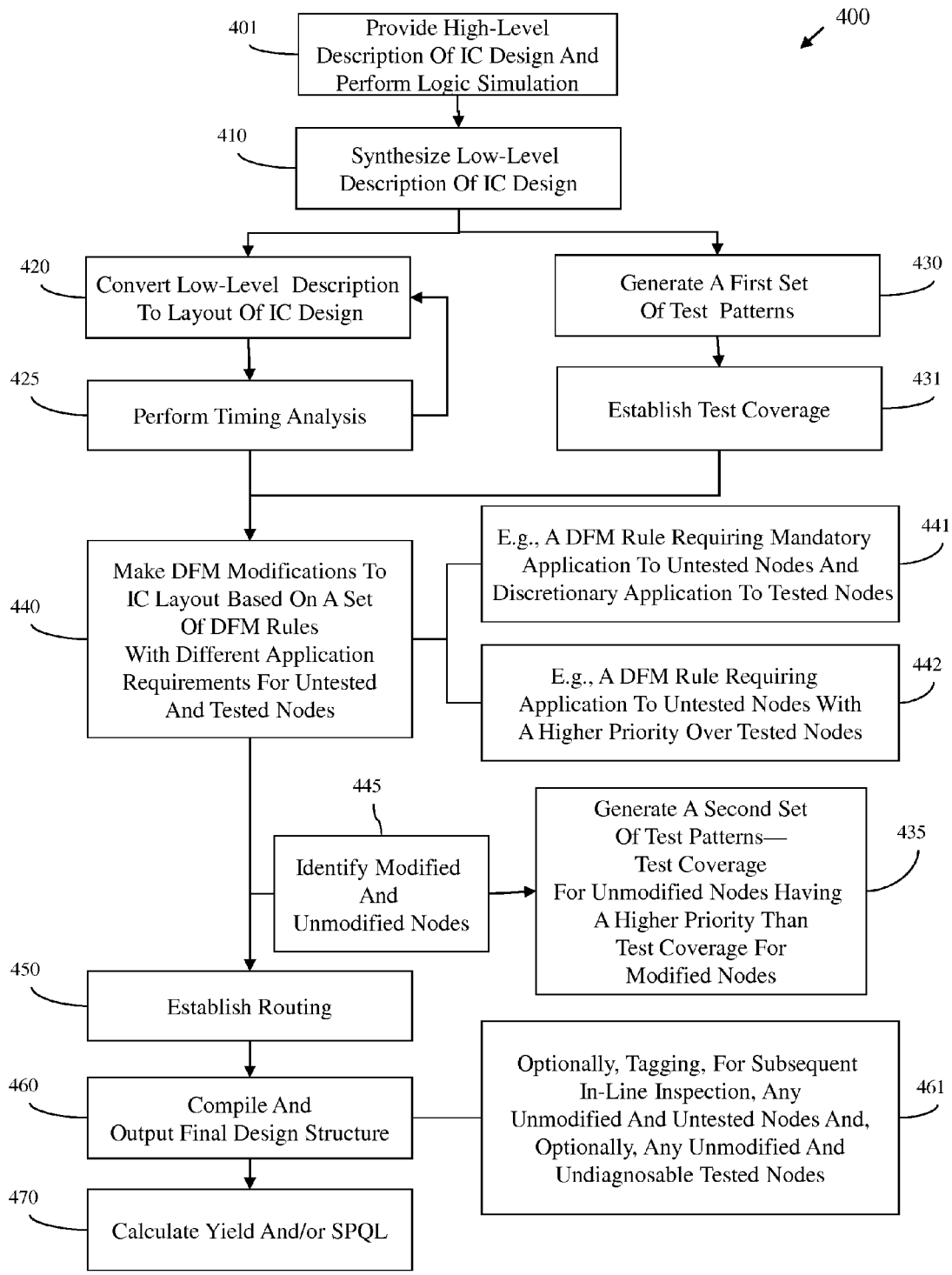
FIG. 4 is a flow diagram illustrating yet another embodiment of an integrated circuit design method that can be implemented using the system of FIG. 1.
Figure 5:
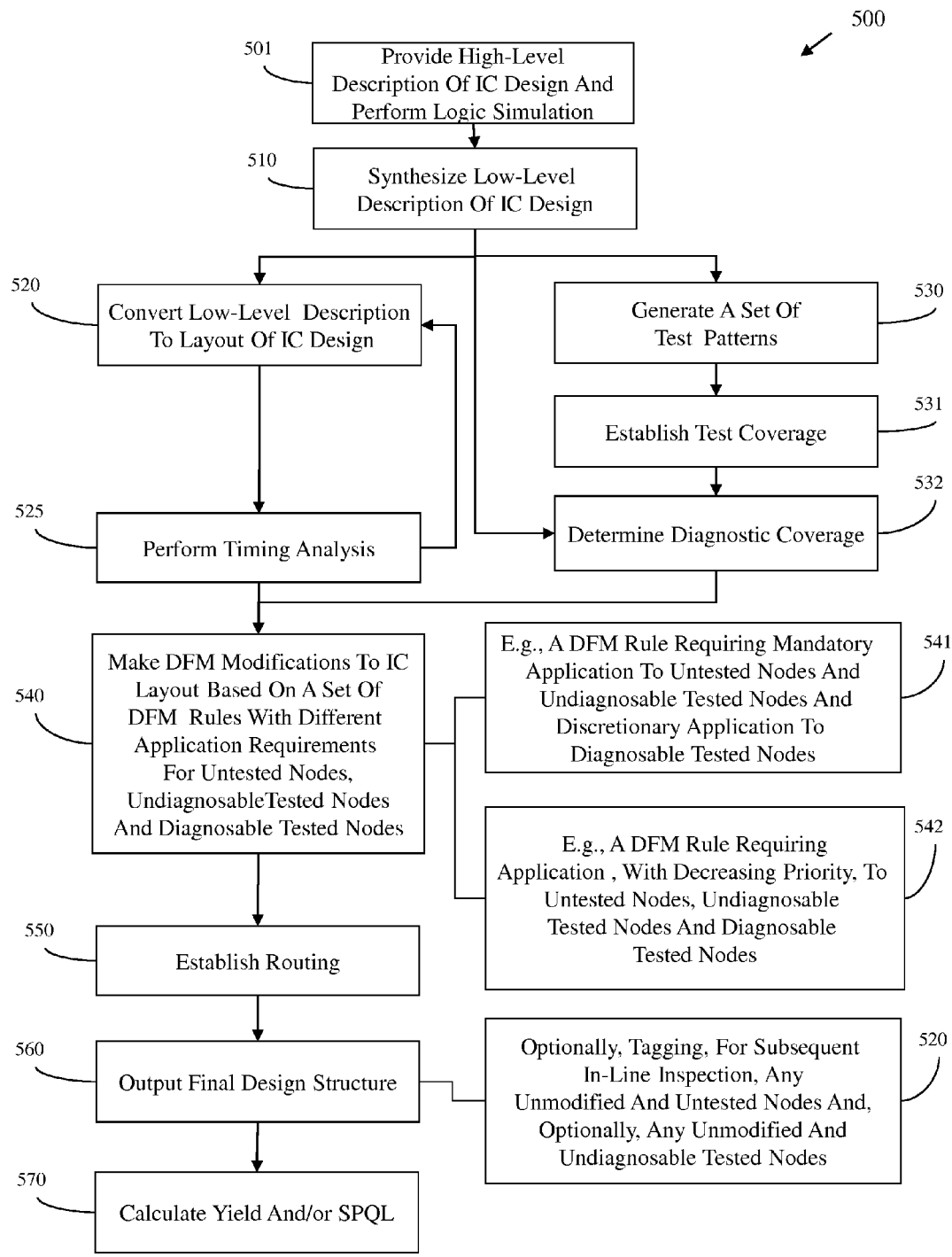
FIG. 5 is a flow diagram illustrating yet another embodiment of an integrated circuit design method that can be implemented using the system of FIG. 1.

Alternatively, referring to FIG. 4 in combination with FIG. 1, rather than basing DFM modifications on test coverage or establishing test coverage based on DFM modifications, an iterative process can be performed, for example, where DFM modifications to the layout of an integrated circuit are made in light of test coverage and then test coverage is altered in light of the DFM modifications. Specifically, a first-level description 102 of an integrated circuit can be stored in a data storage device 101 (401). This first-level description 102 can comprise a high-level description, which sets out the requirements for the integrated circuit in a hardware description language (HDL) (e.g., VHDL or Verilog). Logic simulation of the high-level description can be performed (e.g., by a logic simulator 105) in order to verify the design logic.

Next, a second-level description of the integrated circuit can be synthesized based on the first-level description 102 (410). That is, the high-level description of the integrated circuit can be synthesized into (i.e., converted into) an optimized lower-level description (e.g., a netlist, such as a gate-level or test netlist) by, for example, a logic synthesis tool 110.

Based on this second-level description of the integrated circuit (e.g., based on the netlist for the integrated circuit), a set of test patterns for testing the integrated circuit can be generated by a test pattern generator 130 (e.g., an Automatic Test Pattern Generator) (430). The test patterns can be generated based on a set of rules for test pattern generation 136 (e.g., stored in the data storage device 101). These rules can, for example, be economically based (e.g., require testing for shorts and opens at only those nodes where costs associated with testing are minimal). Such test patterns will be applied to the integrated circuit during subsequent testing to validate circuitry functioning at the various nodes in the integrated circuit, as manufactured. Next, test coverage can be established (e.g., by the test pattern generator 130) and, more specifically, nodes covered by the test patterns (i.e., tested nodes) and nodes not covered by the test patterns (i.e., untested nodes) can be identified and tagged (e.g., with a special code) for future reference (431).

Additionally, the second-level description of the integrated circuit (e.g., the netlist for the integrated circuit) can further be converted to a layout of the integrated circuit (420). For example, a placement tool 120 can establish placement of devices or, more particularly, placement of groups of interconnected devices (i.e., cells or blocks) as set forth in the second-level description. Layout versus schematic (LVS) checking techniques can be used to associate specific polygons in the layout with the untested and tested nodes and can tag them accordingly in the layout (e.g., with a special code). Once placement is established, timing analysis can be performed on the integrated circuit (425). That is, a timing analysis tool 125 can verify circuit logic and timing at one or more specific timing corners. It should be noted that placement and timing analysis can be iteratively repeated, if necessary, to ensure timing specifications are met.

Modifications can then be made to the layout by a design-for-manufacturability (DFM) tool 140 and based on a set of design-for-manufacturability (DFM) rules 146 (440). Specifically, a set of DFM rules 146 (e.g., stored in the data storage device 101) can set out rules regarding minimum distances, sizes, enclosure criteria, etc. for implementing the layout and can, thereby improve the manufacturability of the integrated circuit (i.e., to improve yield and/or reliability of the integrated circuit, as manufactured). For example, DFM modifications can be made by a DFM tool 140 to enhance elements of individual cells, to enhance higher-level routing (e.g., by increasing wire widths and/or by providing redundant vias), to enhance memory redundancy, to increase spacing between wires or vias, to avoid particularly difficult to print layout patterns, etc. Additionally, these DFM rules 146 can further specify different application requirements for the untested nodes as compared to the test nodes. That is, one particular DFM rule can require mandatory application to the circuitry from which any untested nodes receive signals, but only discretionary application to of the circuitry from which any tested nodes receive signals (441). For example, a rule can specify mandatory formation of redundant vias within the circuitry connected to the untested nodes and/or mandatory increases in wire width for wires within the circuitry connected to the untested nodes. Another particular DFM rule can require application to any untested nodes at a higher priority than application to the tested nodes (442). For example, a rule can specify that, when space constraints limit redundant via formation, redundant vias shall be formed within the circuitry connected to untested nodes before such redundant vias are formed within the circuitry connected to any tested nodes and/or that, when space constraints limit increases in wire width, wires within the circuitry connected to the untested nodes will be increased in width before wires within the circuitry connected to the tested nodes.

After the DFM modifications are made at process 440, modified nodes and unmodified nodes in the integrated circuit can be identified and tagged (e.g., with a special code) in the first-level description 102 (445) in order to distinguish nodes having a more robust layout from those having a less robust layout due to DFM modifications. For example, layout versus schematic (LVS) checking techniques can be used to associate specific polygons in the layout with the modified and unmodified nodes and then tag them accordingly in the first-level description 102. As mentioned above, for the purpose of this disclosure, the term "modified nodes" refers to nodes receiving signals from circuitry that has been subject to DFM modifications and the term "unmodified nodes" refers to nodes receiving signals from circuitry that has not been subject to DFM modifications.

Finally, a second set of test patterns for testing the integrated circuit can be generated by the test pattern generator 130 (435). In this case, the test patterns can be generated based on the same set of rules for test pattern generation 136. However, these rules 136 can also specifically indicate that test coverage for the unmodified nodes should have a higher priority than test coverage for the modified nodes. Again, the test patterns will be applied to the integrated circuit during subsequent testing to validate the functioning of the various nodes in the integrated circuit, as manufactured. Additionally, the rules 136 for test pattern generation can be conditional upon the level of test coverage and/or the number of iterations performed (i.e., the number of test pattern generation processes performed based on the integrated circuit layout and the number of times the integrated circuit layout is modified based on test coverage). For example, the rules 146 can further indicate that, depending upon the level of test coverage or the number of iterations of test pattern generation and layout modifications, the type of test patterns sets generated can be modified (e.g., from full scan to logic built-in self-test (LBIST)) and/or the specific parts of the integrated circuit design targeted can be changed.

Consequently, in this embodiment of the design method, DFM modifications to the layout of an integrated circuit are made in light of test coverage and then test coverage is altered in light of the DFM modifications. In other words, test coverage and DFM modifications to achieve a robust layout are balanced.

Those skilled in the art will recognize that diagnostics are used to connect an electrical failure to a physical defect (i.e., to determine that a particular electrical failure detected at test was caused by a particular physical defect) and have become an important tool for yield learning. Although a node is tested (i.e., covered by test patterns), a detected failure at that node at test may be undiagnosable, due to the configuration of the circuitry from which the node receives signals or due to the placement of that node relative to other nodes. That is, the physical defect which is the root cause of a failure detected at a tested node is not always capable of being determined. Therefore, referring to FIG. 5 in combination with FIG. 1, in yet another embodiment, DFM modifications to the layout of an integrated circuit can be made in light of (i.e., with knowledge and consideration of) test coverage and also in light of diagnostic coverage. For the purpose of this disclosure, the term "diagnostic coverage" refers to whether tested nodes are "diagnosable" or "undiagnosable" upon failure. The term "diagnosable tested node" refers to a node for which the root cause of a failure detected at test can be diagnosed. That is, it refers to a node which can be tested and, in the event of a failure detected at test, a particular physical defect, which is within the circuitry connected to the node and which caused the detected failure, can be determined. Finally, the term "undiagnosable tested node" refers to a node for which the root cause of a failure detected at test can not be diagnosed. That is, it refers to a node which can be tested; however, in the event of a failure detected at test, the particular physical defect, which is within the circuitry connected to the node and which caused the failure, can not be determined. It should be understood that for the purposes of this disclosure the definition of "diagnosable" or "diagnosability" may include criteria such as diagnostic resolution and accuracy.

Specifically, in this embodiment as with the previous embodiments, a first-level description 102 of an integrated circuit can be stored in a data storage device 101 (501). This first-level description 102 can comprise a high-level description, which sets out the requirements for the integrated circuit in a hardware description language (HDL) (e.g., VHDL or Verilog). Logic simulation of the high-level description can be performed (e.g., by a logic simulator 105) in order to verify the design logic.

Next, a second-level description of the integrated circuit can be synthesized based on the first-level description 102 (510). That is, the high-level description of the integrated circuit can be synthesized into (i.e., converted into) an optimized lower-level description (e.g., a netlist, such as a gate-level or test netlist) by, for example, a logic synthesis tool 110.

Based on this second-level description of the integrated circuit (e.g., based on a netlist of the integrated circuit), a set of test patterns for testing the integrated circuit can be generated by a test pattern generator 130 (e.g., an Automatic Test Pattern Generator) (530). The test patterns can be generated based on a set of rules for test pattern generation 136 (e.g., stored in the data storage device 101). These rules can, for example, be economically based (e.g., require testing for shorts and opens at only those nodes where costs associated with testing are minimal). Such test patterns will be applied to the integrated circuit during subsequent testing to validate the circuitry functioning at various nodes in the integrated circuit, as manufactured. Next, test coverage can be established (e.g., by the test pattern generator 130) and, more specifically, nodes covered by the test patterns (i.e., tested nodes) and nodes not covered by the test patterns (i.e., untested nodes) can be identified and tagged (e.g., with a special code) for future reference (531).

Next, diagnostic coverage can be determined (532). That is, the second-level description of the integrated circuit (e.g., the netlist for the integrated circuit) can be analyzed (e.g., by a diagnosability analyzer 132) in order to identify, from amongst all of the tested nodes, undiagnosable tested nodes and diagnosable tested nodes. More specifically, as discussed in detail above, a node may be testable, but not readily distinguishable from other nodes in terms of diagnostic results (i.e., in terms of whether the cause of a failure detected at that node at test can be determined). One exemplary technique for determining (i.e., measuring) the diagnosability of a tested node is based on equivalency class size. An equivalency class can contain all nodes that cannot be further resolved using a diagnostic technique, such as diagnostic simulation. Those skilled in the art will recognize that equivalency classes can, in some situations, depend on test patterns. Furthermore, equivalency class size criteria may be used based on logical number of nodes or based on layout or design information, such as physical area, critical area content, timing, performance, node position relative to other nodes, reticle information, etc. Additionally, those skilled in the art will recognize that oftentimes design constraints or limits can also impact diagnosability and should be considered.

Additionally, the second-level description of the integrated circuit (e.g., the netlist for the integrated circuit) can further be converted to a layout of the integrated circuit (520). For example, a placement tool 120 can establish placement of devices or, more particularly, placement of groups of interconnected devices (i.e., cells or blocks) as set forth in the second-level description. Layout versus schematic (LVS) checking techniques can be used to associate specific polygons in the layout with the untested nodes, the undiagnosable tested nodes and diagnosable tested nodes and can tag them accordingly in the layout (e.g., with a special code). Once placement is established, timing analysis can be performed on the integrated circuit (525). That is, a timing analysis tool 125 can verify circuit logic and timing at one or more specific timing corners. It should be noted that placement and timing analysis can be iteratively repeated, if necessary, to ensure timing specifications are met.

Modifications can then be made to the layout by a design-for-manufacturability (DFM) tool 140 and based on a set of design-for-manufacturability (DFM) rules 146 (540). Specifically, a set of DFM rules 146 (e.g., stored in the data storage device 101) can set out rules regarding minimum distances, sizes, enclosure criteria, etc. for implementing the layout and can, thereby improve the manufacturability of the integrated circuit (i.e., to improve yield and/or reliability of the integrated circuit, as manufactured). For example, DFM modifications can be made by a DFM tool 140 to enhance elements of individual cells, to enhance higher-level routing (e.g., by increasing wire widths and/or by providing redundant vias), to enhance memory redundancy, to increase spacing between wires or vias, to avoid particularly difficult to print layout patterns, etc. Additionally, these DFM rules 146 can further specify different application requirements for the untested nodes, the undiagnosable tested nodes and the diagnosable tested nodes. That is, one particular DFM rule can require mandatory application to all of the untested nodes and undiagnosable tested nodes, but only discretionary application to any of the diagnosable tested nodes (541). For example, a rule can specify mandatory formation of redundant vias within the circuitry connected to untested nodes and undiagnosable tested nodes and/or mandatory increases in wire width for wires within the circuitry connected to untested nodes and undiagnosable tested nodes. Another particular DFM rule can specify a range of priorities for application of the particular rule to the untested nodes, the diagnosable tested nodes, and the undiagnosable tested nodes, with the untested nodes having a highest priority and the diagnosable tested nodes having a lowest priority (542). For example, a rule can specify that, when space constraints limit redundant via formation, redundant vias shall be formed within the circuitry connected to untested nodes before such redundant vias are formed within the circuitry connected to undiagnosable tested nodes and further formed within the circuitry connected to undiagnosable tested nodes before such redundant vias are formed within the circuitry connected to diagnosable tested nodes and/or that, when space constraints limit increases in wire width, wires within the circuitry connected to untested nodes will be increased in width before wires within the circuitry connected to undiagnosable tested nodes and wires within the circuitry connected to undiagnosable tested nodes will be increased in width before wires within the circuitry connected to diagnosable tested nodes.

It should be noted that, during the processes 531 and 532 of establishing test coverage and determining diagnostic coverage, duplicate nodes can further be identified. For the purposes of this disclosure, the term "duplicate nodes" refer to nodes which receive signals from essentially identical circuitry at different locations within the integrated circuit. Then, for a group of duplicate nodes, if at least one node is a tested node and at least one node is an untested node, all of the nodes in the group can be treated as tested nodes for purposes of making modifications based on the set of DFM rules 146 at process 540. This is because failure of a tested node can indicate a corresponding failure of any untested nodes in the same group of duplicate nodes, effectively extending test coverage to the duplicate untested nodes. Similarly, for a group of duplicate tested nodes (i.e., tested nodes that receive signals from essentially identical circuitry at different locations within the integrated circuit), if at least one node is a diagnosable tested node and at least one node is an undiagnosable tested node, all of the nodes in the group can be treated as diagnosable tested nodes for purposes of making the modifications based on the set of DFM rules. This is because diagnosis of a failure of one tested node can indicate a corresponding diagnosis of the same failure of any duplicate undiagnosable tested nodes, effectively extending diagnostic coverage to the duplicate undiagnosable tested nodes.

Consequently, in this embodiment of the design method, DFM modifications are made in light of (i.e., with knowledge and consideration of) test coverage as well as diagnostic coverage so that as many untested nodes and undiagnosable tested nodes as possible are covered by DFM to avoid subsequent failure in the manufactured product. In other words, for selected nodes, test coverage and diagnostic coverage is supplanted by a more robust layout due to DFM modifications.

In each of the design method embodiments described above and illustrated in FIGS. 2-5, after test coverage is established and the DFM modifications are made, a detailed routing for the integrated circuit, as designed, can be established (e.g., by a routing tool 150) (250, 350, 450, 550). This detailed routing can define the wires that will interconnect the cells. Then, the final results of the above-described processes can be compiled (e.g., by a compiling tool 160) in order to generate a final design structure 162, which can be stored and/or output, as discussed below (260, 360, 460, 560). The final design structure 162, as generated, can comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce the integrated circuit chip. This final design structure 162 can, for example, reside in a storage medium (e.g., data storage device 101) or in programmable gate array in a data format used, for example, for the exchange of layout data of integrated circuits and/or a symbolic data format (e.g. information stored in a GDSII (GDS2), GL1, OASIS, map files, or any other suitable format for storing such design data structures). This final design structure 162 may further be output so that it can proceed to tape-out, be released to manufacturing, be released to a mask house, be sent to another design house, be sent back to a customer, etc.

During generation of the final design structure 162, unmodified nodes (i.e., any nodes that do not receive signals from circuitry which was modified according to DFM rules at process 240, 340, 440, 540) and untested nodes (i.e., nodes not covered by test at process 231, 331, 431, 531) (and, optionally, any unmodified and undiagnosable tested nodes) can be identified and tagged (e.g., with a special code) (261, 361, 461, 561). Identifying and tagging such nodes allows for subsequent targeted in-line inspections (e.g., optical inspections, such as scanning electron microscope (SEM) inspections) during manufacture in order to concentrate on areas of concern, which were not addressed during design and test. Such inspections would ideally be used as disposition criteria on a chip by chip or by wafer basis and the inspection sample can be statistically based in order to minimize inspections or maximize benefit.

Additionally, the results of each of the design method embodiments described above and illustrated in FIGS. 2-5 can be used by a yield and/or a Shipped Product Quality Level (SPQL) calculator 170 to calculate yield and/or SPQL (270, 370, 470, 570). That is, yield and/or SPQL can be calculated based on both the test coverage and the DFM modifications, including those DFM modifications made specifically to nodes lacking test coverage and, if applicable, lacking diagnostic coverage. These design method embodiments may not result in a significant improvement to overall yield, as they are not designed to decrease the number of failures of tested nodes. However, they should result in significant improvements to the SPQL level because untested nodes are made more robust to avoid failure in the untested nodes.

It should be noted that in the above-described embodiments test pattern generation can be accomplished using a conventional automatic test pattern generator (ATPG), logic synthesis can be accomplished using a conventional logic synthesis tool, placement can be accomplished using a conventional placement tool, timing analysis can be established using a conventional timing analysis tool, design-for-manufacturability (DFM) modifications can be made using a conventional DFM tool, routing can be accomplished using a conventional routing tool, compiling can be accomplished using a conventional compiler, etc. Such tools are well-known in the art and, thus, the details are omitted from the specification in order to allow the reader to focus on the salient aspects of the invention. As discussed in detail above, the difference between the design method embodiments disclosed herein and prior art design method embodiments lies in the level of communication between these tools (i.e., the level of integration) and the rules upon which they operate.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
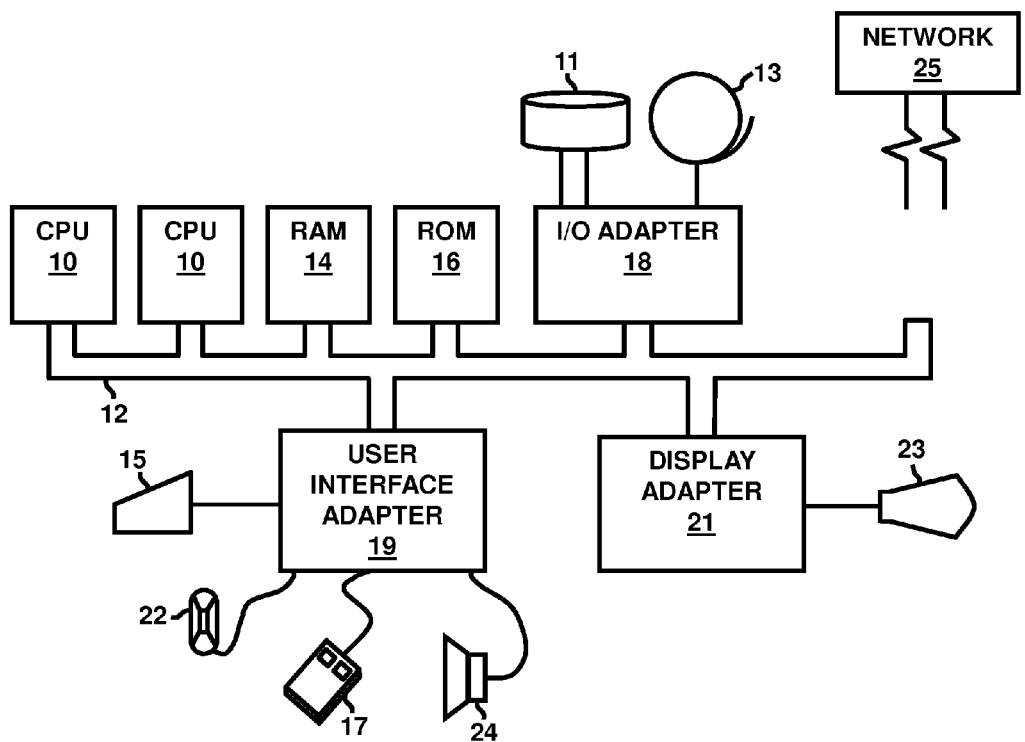
FIG. 6 is a schematic diagram illustrating an exemplary hardware environment that can be used to implement the system and method embodiments of FIGS. 1-5.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It should further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Additionally, the corresponding structures, materials, acts, and equivalents of all means or step plus function elements in the claims below are intended to include any structure, material, or act for performing the function in combination with other claimed elements as specifically claimed. Finally, it should be understood that the description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described were chosen in order to best explain the principles of the invention and the practical application, and to enable others of ordinary skill in the art to understand the invention for various embodiments with various modifications as are suited to the particular use contemplated.

Therefore, disclosed above are embodiments of an integrated circuit design method based on a combination of manufacturability, test coverage and, optionally, diagnostic coverage In one embodiment, design-for manufacturability (DFM) modifications to the layout of an integrated circuit can be made in light of (i.e., with knowledge and consideration of) test coverage. In another embodiment, test coverage of an integrated circuit can be established in light of (i.e., with knowledge and consideration of) DFM modifications. In yet another embodiment, an iterative process can be performed, for example, where DFM modifications to the layout of an integrated circuit are made in light of test coverage and then test coverage is altered in light of the DFM modifications. Finally, in yet another embodiment, DFM modifications to the layout of an integrated circuit can be made in light of (i.e., with knowledge and consideration of) test coverage and also in light of diagnostic coverage. In other words, the design method embodiments disclosed above integrate designing for manufacturability, test coverage and, optionally, diagnostic coverage such that low DFM areas get improved test focus and/or low test coverage areas and, optionally, low diagnostic coverage areas can get improved DFM focus. In any case, after making DFM modifications and establishing test coverage, any unmodified and untested nodes (and, optionally, any unmodified and undiagnosable tested nodes) in the integrated circuit can be identified and tagged for subsequent in-line inspection.

What is claimed is:

1. An integrated circuit design method comprising:
   accessing, by a computer system from a data storage device, a description of an integrated circuit;
   generating, by said computer system based on said description of said integrated circuit, a set of test patterns for testing said integrated circuit;
   identifying, by said computer system, tested nodes in said integrated circuit covered by said test patterns and untested nodes in said integrated circuit not covered by said test patterns;
   converting, by said computer system, said description of said integrated circuit to a layout of said integrated circuit; and
   making, by said computer system and based on a set of design-for-manufacturability (DFM) rules stored in said data storage device, modifications to said layout, said DFM rules specifying different application requirements for said untested nodes and said tested nodes.

2. The integrated circuit design method of claim 1, said DFM rules comprising a particular rule specifying mandatory application to all of said untested nodes and discretionary application to any of said tested nodes.

3. The integrated circuit design method of claim 2, said particular rule specifying one of mandatory formation of redundant vias connected to said untested nodes and mandatory increases in wire width for wires connected to said untested nodes.

4. The integrated circuit design method of claim 1, said DFM rules comprising a particular rule specifying a higher priority for application of said particular rule to said untested nodes than to said tested nodes.

5. The integrated circuit design method of claim 4, said particular rule specifying any one of the following:
   when space constraints limit redundant via formation, redundant vias shall be formed to said untested nodes before said tested nodes; and
   when space constraints limit increases in wire width, wires connected to said untested nodes will be increased in width before wires connected to said tested nodes.

6. The integrated circuit design method of claim 1, said description of said integrated circuit comprising a netlist for said integrated circuit.

7. The integrated circuit design method of claim 1, further comprising: identifying, by said computer system, duplicate nodes, one tested and one untested; and for purposes of making said modifications based on said set of DFM rules, treating both said duplicate nodes as tested.

8. The integrated circuit design method of claim 1, further comprising:
   after said making of said modifications, identifying, by said computer system, at least one unmodified and untested node in said integrated circuit; and
   tagging, by said computer system, said at least one unmodified and untested node for in-line inspection.

9. The integrated circuit design method of claim 1, further comprising calculating, by said computer system, at least one of the following based on said test coverage and said modifications: yield and Shipped Product Quality Level (SPQL).

10. An integrated circuit design method comprising:
    accessing, by a computer system from a data storage device, a description of an integrated circuit;
    converting, by said computer system, said description of said integrated circuit to a layout of said integrated circuit;
    making, by said computer system and based on a set of design-for-manufacturability (DFM) rules stored in said data storage device, modifications to said layout;
    after said making of said modifications, identifying, by said computer system, modified nodes in said integrated circuit and unmodified nodes in said integrated circuit; and
    generating, by said computer system and based on said description, a set of test patterns for testing said integrated circuit, said generating comprising applying higher priority for test coverage to said unmodified nodes than to said modified nodes.

11. The integrated circuit design method of claim 10, said description comprising netlist for said integrated circuit.

12. The integrated circuit design method of claim 10, further comprising calculating, by said computer system at least one of the following based on said modifications and said test coverage: yield and Shipped Product Quality Level (SPQL).

13. An integrated circuit design method comprising:
    accessing, by a computer system from a data storage device, a description of an integrated circuit;
    generating, by said computer system and based on said description of said integrated circuit, a first set of test patterns for testing said integrated circuit;
    identifying, by said computer system, tested nodes covered by said test patterns and untested nodes not covered by said test patterns;
    converting, by said computer system, said description to a layout of said integrated circuit;
    making, by said computer system and based on a set of design-for-manufacturability (DFM) rules stored in said data storage device, modifications to said layout, said DFM rules specifying different application requirements for said untested nodes and said tested nodes; and
    after said making of said modifications, identifying, by said computer system, modified nodes in said integrated circuit and unmodified nodes in said integrated circuit and further generating, by said computer system, a second set of test patterns for testing said integrated circuit, said generating of said second set of test patterns comprising applying higher priority for test coverage to said unmodified nodes than to said modified nodes.

14. The integrated circuit design method of claim 13, said DFM rules comprising a particular rule specifying mandatory application to all of said untested nodes and discretionary application to any of said tested nodes.

15. The integrated circuit design method of claim 14, said particular rule specifying one of mandatory formation of redundant vias connected to said untested nodes and mandatory increases in wire width for wires connected to said untested nodes.

16. The integrated circuit design method of claim 13, said DFM rules comprising a particular rule specifying a higher priority for application of said particular rule to said untested nodes than to said tested nodes.

17. The integrated circuit design method of claim 16, said particular rule specifying any one of the following:
    when space constraints limit redundant via formation, redundant vias shall be formed to said untested nodes before said tested nodes; and
    when space constraints limit increases in wire width, wires connected to said untested nodes will be increased in width before wires connected to said tested nodes.

18. The integrated circuit design method of claim 13, said description comprising a netlist for said integrated circuit.

19. The integrated circuit design method of claim 13, further comprising:
    after said making of said modifications, identifying, by said computer system, at least one unmodified and untested node in said integrated circuit; and
    tagging, by said computer system, said at least one unmodified and untested node for in-line inspection.

20. The integrated circuit design method of claim 13, further comprising calculating at least one of the following based on said test coverage and said modifications: yield and Shipped Product Quality Level (SPQL).

21. An integrated circuit design method comprising:
    accessing, by a computer system from a data storage device, a description of an integrated circuit;
    generating, by said computer system and based on said description of said integrated circuit, test patterns for testing said integrated circuit;
    identifying, by said computer system, tested nodes covered by said test patterns and untested nodes not covered by said test patterns;
    converting, by said computer system, said description to a layout of said integrated circuit;
    analyzing, by said computer system, said description to identify, from amongst said tested nodes, undiagnosable tested nodes and diagnosable tested nodes; and
    making, by said computer system and based on a set of design-for-manufacturability (DFM) rules stored in said data storage device, modifications to said layout, said DFM rules specifying different application requirements for said untested nodes, said undiagnosable tested nodes and said diagnosable tested nodes.

22. The integrated circuit design method of claim 21, said DFM rules comprising a particular rule specifying mandatory application to all of said untested nodes and all of said undiagnosable tested nodes and discretionary application to any of said tested nodes.

23. The integrated circuit design method of claim 22, said particular rule specifying one of mandatory formation of redundant vias connected to said untested nodes and said undiagnosable tested nodes and mandatory increases in wire width for wires connected to said untested nodes and said undiagnosable tested nodes.

24. The integrated circuit design method of claim 21, said DFM rules comprising a particular rule specifying a range of priorities for application of said particular rule to said untested nodes, said diagnosable tested nodes, and said undiagnosable tested nodes, with said untested nodes having a highest priority and said undiagnosable tested nodes having a lowest priority.

25. The integrated circuit design method of claim 24, said particular rule specifying any one of the following:
when space constraints limit redundant via formation, redundant vias shall be formed to said untested nodes before said undiagnosable tested nodes and to said undiagnosable tested nodes before said diagnosable tested nodes; and
when space constraints limit increases in wire width, wires connected to said untested nodes will be increased in width before wires connected to said undiagnosable tested nodes and wires connected to said undiagnosable tested nodes will be increased in width before wires connected to said diagnosable tested nodes.

* * * * *